United States Patent
Bonny

(10) Patent No.: US 8,312,784 B2
(45) Date of Patent: Nov. 20, 2012

(54) ROTARY-LINEAR ACTUATOR WITH OPTIMISED ROLLERS

(75) Inventor: Franck Bonny, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 13/146,822

(22) PCT Filed: Feb. 5, 2010

(86) PCT No.: PCT/FR2010/050190
§ 371 (c)(1),
(2), (4) Date: Jul. 28, 2011

(87) PCT Pub. No.: WO2010/089515
PCT Pub. Date: Aug. 12, 2010

(65) Prior Publication Data
US 2011/0277571 A1  Nov. 17, 2011

(30) Foreign Application Priority Data
Feb. 9, 2009 (FR) .................................. 09 50795

(51) Int. Cl.
*F16C 19/50* (2006.01)
*F16H 55/02* (2006.01)
(52) U.S. Cl. .......................................... 74/424; 384/550
(58) Field of Classification Search ............... 74/424.91, 74/424.92; 384/550
See application file for complete search history.

(56) References Cited

U.S. PATENT DOCUMENTS

| | | | |
|---|---|---|---|
| 3,214,991 A * | 11/1965 | Perrin | 74/424.92 |
| 3,508,452 A * | 4/1970 | Roantree | 74/424.7 |
| 3,595,094 A | 7/1971 | Lemor | |
| 3,726,151 A | 4/1973 | Lemor | |
| 3,884,090 A | 5/1975 | Dock | |
| 4,033,194 A | 7/1977 | Stanley | |
| 4,037,893 A * | 7/1977 | Perrin | 384/550 |
| 4,050,319 A | 9/1977 | Stanley | |
| 4,375,770 A | 3/1983 | Druet | |
| 4,470,646 A * | 9/1984 | Fuchsluger | 384/550 |
| 4,884,466 A | 12/1989 | Duruisseau | |
| 6,170,351 B1 | 1/2001 | Zernickel | |
| 7,000,495 B2 | 2/2006 | Benoit | |
| 7,044,012 B2 | 5/2006 | Dubus et al. | |

(Continued)

FOREIGN PATENT DOCUMENTS
EP  1359345  11/2005

(Continued)

OTHER PUBLICATIONS

International Search Report from counterpart PCT Application No. PCT/US/04/29495 Report Dated Jul. 5, 2005.

(Continued)

*Primary Examiner* — Phillip A Johnson
(74) *Attorney, Agent, or Firm* — Miller, Matthias & Hull LLP

(57) ABSTRACT

According to the invention, an actuator device comprises rollers positioned and guided by spacer rings, and an assembly consisting of said rollers and said rings is provided between a male part and a female part. The rollers include synchronization pinions arranged at the ends thereof and include, on the threaded portion located between said pinions, annular grooves used as a journal for interfacing with open bearings in the form of notches provided on each spacer ring.

6 Claims, 2 Drawing Sheets

U.S. PATENT DOCUMENTS

2008/0196529 A1* 8/2008 Sugitani ............... 74/424.89
2010/0269616 A1* 10/2010 Merlet et al. ........... 74/424.92

FOREIGN PATENT DOCUMENTS

| | | |
|---|---|---|
| EP | 1617103 A1 | 1/2006 |
| FR | 2093070 | 1/1972 |
| FR | 2837550 | 9/2003 |
| JP | 2007177912 A | 7/2007 |
| WO | WO 2006/031217 A1 | 3/2006 |

OTHER PUBLICATIONS

Search Report from counterpart French Application No. FR 0950795 Report Dated Sep. 4, 2009.

Search Report from PCT Application No. PCT/FR2010/050190 Report Dated Apr. 26, 2010.

* cited by examiner

ROTARY-LINEAR ACTUATOR WITH OPTIMISED ROLLERS

CROSS-REFERENCE TO RELATED APPLICATIONS

This application is a U.S. national stage filing of International Patent Application No. PCT/FR2010/050190 filed on Feb. 5, 2010, which claims priority under the Paris Convention to French Patent Application No. 09 50795, filed on Feb. 9, 2009.

FIELD OF THE DISCLOSURE

The invention relates to an improvement to current actuator devices generally referred to as rotary-linear actuators with satellite rollers.

BACKGROUND OF THE DISCLOSURE

These actuator devices consist of a male part and a female part which are coaxial and threaded, with satellite rollers between them, also threaded, joined by rings to form a kind of cylinder.

In one case, the cylinder is integrally attached to the male part in the sense that it only rotates around this male part with no axial displacement; the threading of this male part and the threading of the rollers are inverted, with the same pitch. The female part is in the form of an internally threaded sheath having a different pitch than that of the male part.

In the other case, the cylinder is integrally attached to the female part which is in the form of a sleeve acting as a nut; the cylinder is then associated with this sleeve nut. The threading of the rollers has the same pitch, but inverted, as that of the sleeve nut, and the male part in this case has threading of a length adapted to the travel of the actuator with a pitch which differs from that of the sleeve nut.

The combined movements of the male and female parts and the rollers generate a constant differential spacing between the two parts and a displacement of one relative to the other at each rotation.

The service life of these actuators depends on several factors such as the materials used and the lubricants, but also depends on the length of the active threads of the satellite rollers, as these rollers are wearing parts.

For some applications, in aerospace for example, such actuators are subject to weight and space constraints as well as constraints related to maintenance. The actuators must be able to operate with complete reliability, without maintenance, for thousands of hours. These constraints mean that technological solutions must be adopted which are both simple and effective.

The satellite rollers are spaced apart from each other, forming a kind of cylinder. They may be positioned and guided relative to each other in two ways: either as described in document JP 2007 177912, by engaging their synchronization pinions into two sets of teeth—one external set of teeth and one internal set of teeth, or as described in patents FR 2 837 550 and FR 2 093 070, by means of spacer rings with a single engagement mechanism, and it is this assembly consisting of rollers and rings which forms a kind of cylinder.

The rollers described in document JP 2007 177912 have no need for spacer rings and do not contain any arrangements which could act as journals. In addition, in this embodiment, the rollers are of significant size because of the length of the lateral pinions which each slide longitudinally on their internal gear and setting ring.

The ends of the roller, as described in the two documents FR 2 837 550 and 2 093 070 mentioned above, are shaped to have journals which cooperate with openings in these spacer rings that serve as bearings.

The rollers have a central threaded part between the two journals at the ends, and between this central part and said journals, they have synchronization pinions on each side which hold each roller in place relative to the part with which they are associated: either the male part or the female part.

The rollers, as described in above-cited document FR 2 837 550, are cylindrical in shape and threaded along their periphery, and the pinions are cut directly into the threading at the two ends, between the central threaded part and the journals.

However, the teeth of the pinions end on the threading and their grip on the threading limits the useful and effective length of this threading.

SUMMARY OF THE DISCLOSURE

The invention proposes a novel arrangement of rollers which singularly improves this type of actuator device on several levels.

Firstly, for the same longitudinal dimensions of the rollers, the invention provides a significant increase in the useful and effective length of the threading on the central part of these rollers, by an order of 20%.

The spacing rings which position and guide the rollers are automatically centered, meaning they do not require additional means to immobilize them, unlike the devices described in documents FR 2 837 550 and 2 093 070 for example.

The actuator device of the invention comprises two satellite rollers which are positioned and guided by spacer rings. The assembly consisting of these rollers and rings forms a cylinder which is placed between two parts which are also threaded, a male part and a female part. The rollers comprise synchronization pinions arranged at their ends and at least one annular neck acting as a journal on the length of their threaded portion situated between said pinions, each journal cooperating with a bearing in the form of an open notch arranged in said spacer ring for said rollers.

In a preferred arrangement of the invention, the rollers have two necks, each neck being arranged between an end pinion and the central threaded part and acting as a journal cooperating with the corresponding spacer ring.

Still according to the invention, each spacer ring for the rollers has bearings in the form of radial notches and, depending on the case, these cavities are open towards the inside, meaning towards the male part, or towards the outside, meaning towards the female part; they are open towards the inside when the rollers are associated with the female part and they are open towards the outside when the rollers are associated with the male part.

Still according to the invention, the diameter of the journals is about half the diameter of the rollers and the length of these journals is about the same as their diameter.

The invention also relates to the satellite rollers themselves, meaning rollers having pinions at the ends and, between these pinions and the central threaded part, necks which act as journals cooperating with bearings, arranged in the spacer rings, for positioning and guiding said rollers of the actuator device.

BRIEF DESCRIPTION OF THE DRAWINGS

The invention will be further detailed in the following description and the attached drawings, provided for indicative purposes only, in which.

DETAILED DESCRIPTION OF THE DISCLOSURE

Figure 1:
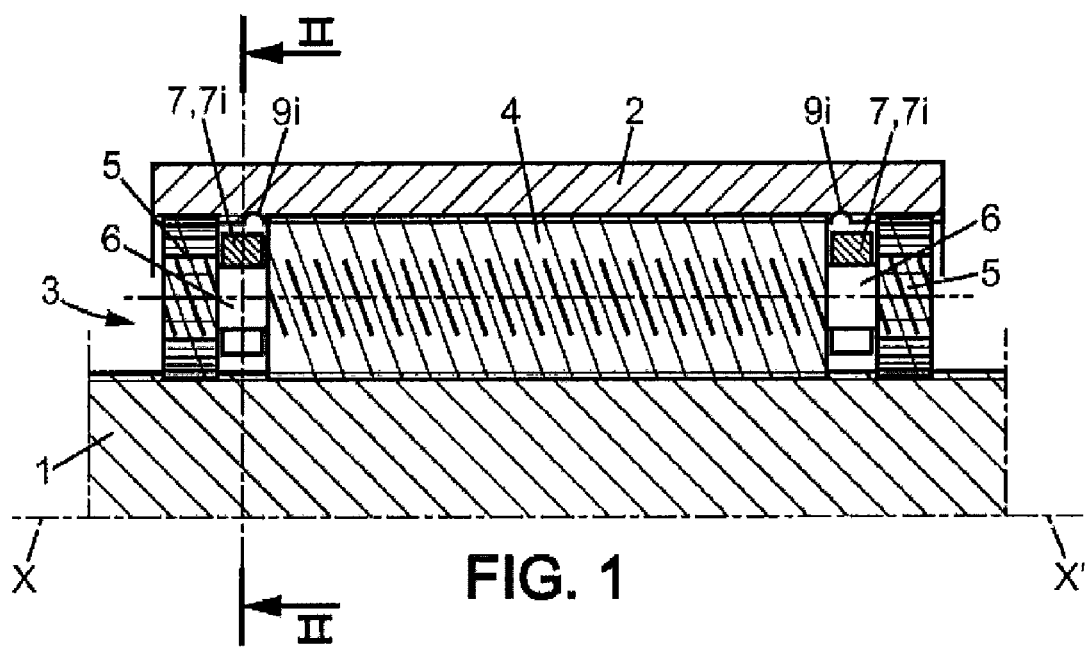
FIG. 1 represents a partial and schematic cross-sectional half view of the portion of the actuator, showing a roller of the invention in which the cylinder is associated with the female part, meaning the sleeve nut.

FIG. 1 shows a portion of the male part 1 and a female part 2 in the form of a sleeve which serves as a nut, with a roller 3 between the two. The two parts 1 and 2 are concentric and the roller 3 is in the form of a cylinder having an axis parallel to and offset from the axis X-X' of said parts 1 and 2.

The roller 3 is a single unit and comprises:
- a central cylindrical part 4 which is threaded and which cooperates with the threading of the male part 1 and of the female part 2,
- a pinion 5 at each end, said pinions 5 each engaging with a set of teeth at the edge of the female part 2, and each also additionally comprising a threading which cooperates with that of the male part 1, the same threading as that of said central part 4,
- necks which are arranged between each pinion 5 and the central part 4, said necks being in the form of journals 6 which cooperate with the rings 7 which space the rollers 3 apart.

Figure 2:
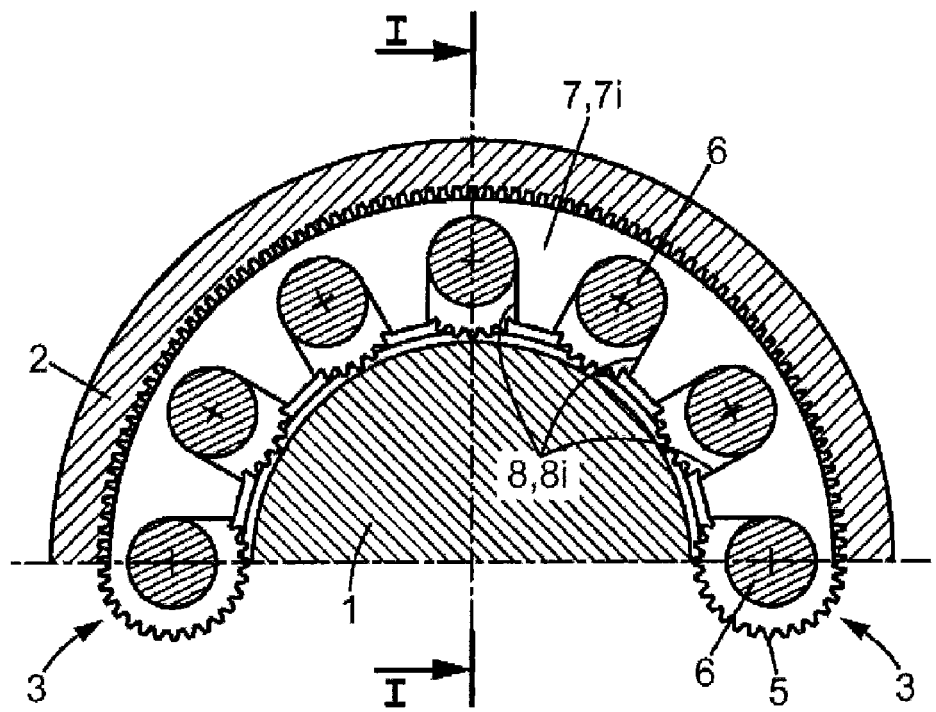
FIG. 2 is a cross-sectional view of II-II in FIG. 1 showing the roller spacer ring with its notches facing inwards, meaning towards the threading on the male part.

In this configuration illustrated in FIGS. 1 and 2, the spacer rings 7 are rings that can be described as interior rings 7i because they are associated with the female part and are situated inside this female part 2.

FIG. 2 shows the male 1 and female 2 parts, which are coaxial, and a spacer ring 7i between the two which positions and holds the different rollers 3 in place relative to each other. The ring 7i has notches 8 which serve as bearings to accommodate the rollers 3 and in particular their journal 6. These notches 8, denoted 8i, are radial and face the center of the actuator, meaning they face towards the male part 1 which is shown as a simple threaded rod.

The rollers 3 are held in position in the notches 8i of the rings 7i by the male part 1 when it is in place, which implies the use of an appropriate tool, not represented, for placing them within said rings 7i, which holds them temporarily in place in all or part of said notches 8i.

The diameter of the journals 6 is, for example, about half the diameter of the roller 3, and the length of these journals 3 is about the same as their diameter, for example. The length of the pinions 5 about the same as that of the journals 3.

Figure 3:
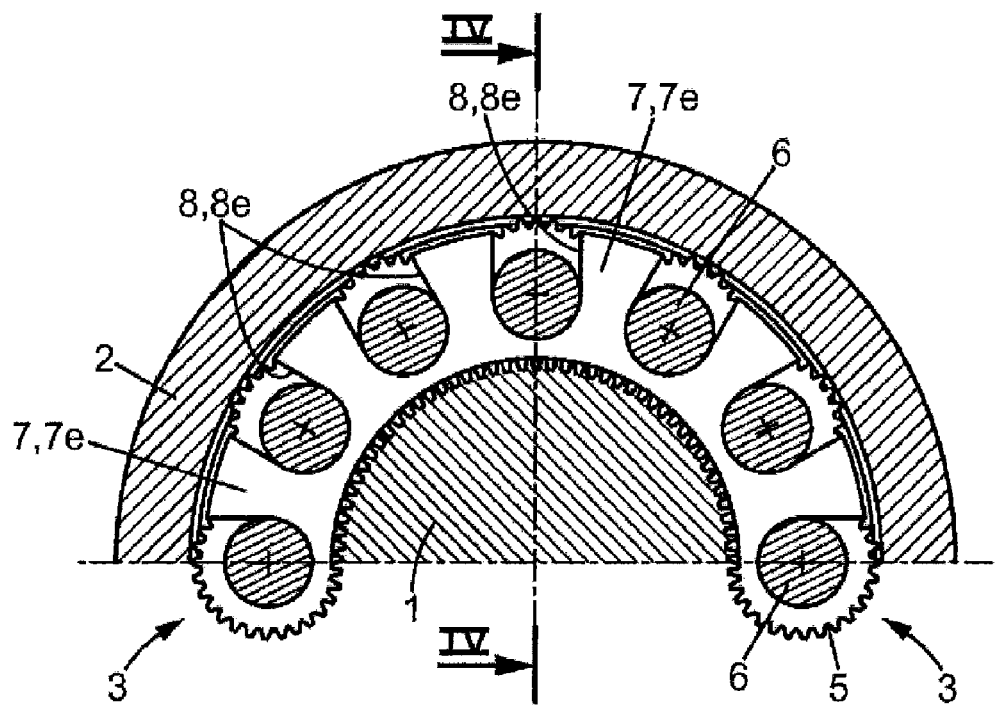
FIG. 3 is a cross-sectional view of III-III in FIG. 4 showing the roller spacer ring with its notches facing outwards, meaning towards the threading on the female part.
Figure 4:
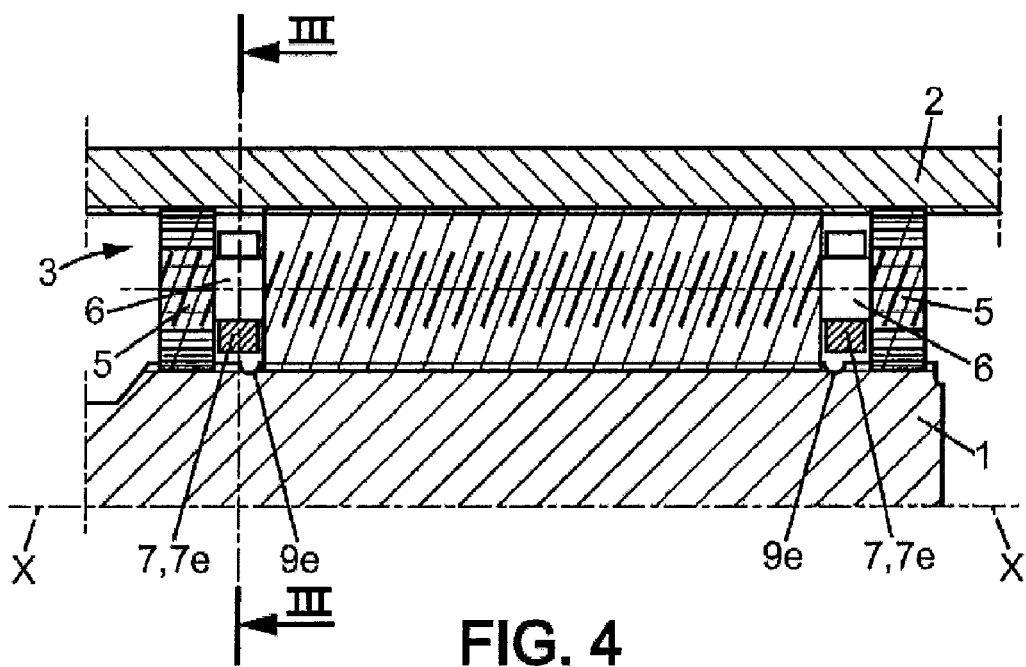
FIG. 4 is a cross-sectional half view also showing a roller for an actuator, in which the cylinder and the rollers are associated with the male part.

FIGS. 3 and 4 correspond to an assembly of the rollers 3 which is inverted in comparison to the assembly in FIGS. 1 and 2. The rollers 3 are associated with the male part 1 and cooperate with the female part 2 which is in the form of a sheath; this sheath is internally threaded for a length which corresponds to the travel of the actuator.

In this case, the rollers 3 are identical to those described above in relation to FIGS. 1 and 2, but they are spaced apart by rings 7 which are different from the rings 7i. The rings 7 represented in FIGS. 3 and 4 rotate on the male part 1 and the notches 8 which accept the journals 6 of the rollers 3 face outwards, meaning they face the female part 2.

In FIG. 3, one can see the male part 1 and the female part 2, and between them, the various rollers 3 and the spacer ring 7, labeled 7e. The radial notches 8 in the ring 7, labeled 8e, face outwards, meaning they face the female part 2.

The rollers 3 are held in place by this female part 2, which implies, as above, the use of an appropriate tool for their assembly.

In both cases, due to their placement on the rollers 3, the rings 7i and 7e are automatically centered between each pinion 5 and the central part 4 of these rollers 3, which means that these rings 7i and 7e are held in place by said rollers 3. The rings 7i are closed towards the internal surface of the female part 2 while the rings 7e are closed towards the male part 1.

Note in FIGS. 1 and 2 the presence of grooves 9i in the female part 2, at the periphery of each ring 7i; these grooves correspond to access areas for machining the internal teeth of said female part 2, teeth which engage with the synchronization pinions 5 of the rollers 3.

FIG. 4 shows access grooves 9e as well. These face outwards, and are arranged in the male part 1 to face the spacer rings 7e.

The invention claimed is:

1. An actuator device comprising satellite rollers positioned and guided by spacer rings between a male part and a female part, wherein each of said satellite rollers comprises two synchronization pinions arranged at both ends of said satellite rollers and, on a threaded part of said satellite rollers located between said pinions, said satellite rollers comprise at least one annular neck serving as a journal which cooperates with bearings in the form of open notches provided on said spacer ring for said satellite rollers.

2. The actuator device according to claim 1, comprising said satellite rollers having an annular neck arranged between each pinion and said threaded part, said annular necks serves as a journal which cooperates with each spacer ring.

3. The actuator device according to claim 2, wherein said bearings are in the form of radially open notches in said spacer rings.

4. The actuator device according to claim 3, wherein said radially notches opening towards said male part.

5. The actuator device according to claim 3, wherein said radially notches open towards said female part.

6. The actuator device according to claim 1, wherein the diameter of said journals is on the order of half the diameter of said satellite rollers, and the length of said journals is on the same order as the diameter of said journals.

* * * * *